US009551241B2

United States Patent
Kamazawa et al.

(10) Patent No.: US 9,551,241 B2
(45) Date of Patent: Jan. 24, 2017

(54) WASTE HEAT RECOVERY POWER GENERATION PLANT FOR SINTERING FACILITY

(75) Inventors: Kazuto Kamazawa, Wako (JP);
Toshiki Ohashi, Chigasaki (JP);
Tomoji Takimoto, Ichikawa (JP);
Katsuki Yasuhara, Tokorozawa (JP)

(73) Assignee: KAWASAKI JUKOGYO KABUSHIKI KAISHA, Kobe-Shi (JP)

( * ) Notice: Subject to any disclaimer, the term of this patent is extended or adjusted under 35 U.S.C. 154(b) by 82 days.

(21) Appl. No.: 14/412,554

(22) PCT Filed: Jul. 2, 2012

(86) PCT No.: PCT/JP2012/066907
§ 371 (c)(1),
(2), (4) Date: Apr. 6, 2015

(87) PCT Pub. No.: WO2014/006677
PCT Pub. Date: Jan. 9, 2014

(65) Prior Publication Data
US 2015/0204216 A1 Jul. 23, 2015

(51) Int. Cl.
*F01K 27/02* (2006.01)
*F01K 11/02* (2006.01)
*F01K 7/18* (2006.01)
*C22B 1/20* (2006.01)
(Continued)

(52) U.S. Cl.
CPC .................. *F01K 27/02* (2013.01); *C22B 1/20* (2013.01); *F01K 7/18* (2013.01); *F01K 11/02* (2013.01); *F01N 5/025* (2013.01); *F22B 1/183* (2013.01)

(58) Field of Classification Search
CPC .............. C22B 1/20; F01K 7/18; F01K 11/02; F01K 27/02; F27D 2017/006
See application file for complete search history.

(56) References Cited

U.S. PATENT DOCUMENTS 7,926,273 B2    4/2011  Sorita et al.

FOREIGN PATENT DOCUMENTS

JP    56166338 A  * 12/1981
JP    A-57-14101      1/1982
JP    A-61-213329     9/1986
(Continued)

OTHER PUBLICATIONS

Jan. 5, 2016 Office Action issued in Japanese Patent Application No. 2014-523463.
(Continued)

*Primary Examiner* — Audrey K Bradley
(74) *Attorney, Agent, or Firm* — Oliff PLC

(57) ABSTRACT

To provide a waste heat recovery power generation plant for sintering facility capable of efficiently recovering a waste heat of a sintering machine in addition to that of a sintered-ore cooler, while restraining that sulfuric anhydride contained in an exhaust gas of the sintering machine forms drops. An SM boiler is configured to heat all of or a part of hot water generated by an SC boiler, by introducing a high temperature part of an exhaust gas of a sintering machine. At this time, a temperature of the hot water to be supplied to the SM boiler is controlled such that a temperature of an exhaust gas at an exhaust-gas temperature of the SM boiler is maintained at a temperature higher than an acid dew point.

9 Claims, 7 Drawing Sheets

(51) Int. Cl.
    *F22B 1/18*    (2006.01)
    *F01N 5/02*    (2006.01)

(56)        References Cited

FOREIGN PATENT DOCUMENTS

JP          S62-29707 A      2/1987
JP          S62-180607 U    11/1987
JP          S63-201488 A     8/1988
JP          A-2000-226618    8/2000
JP          A-2008-157183    7/2008
JP          A-2011-196191   10/2011

OTHER PUBLICATIONS

International Search Report issued in International Application No. PCT/JP2012/066907 mailed Aug. 28, 2012.
Written Opinion of the International Searching Authority issued in International Application No. PCT/JP2012/066907 mailed Aug. 28, 2012.
Jun. 24, 2016 Office Action issued in Japanese Patent Application No. 2014-523463.

* cited by examiner

WASTE HEAT RECOVERY POWER GENERATION PLANT FOR SINTERING FACILITY

TECHNICAL FIELD

The present invention relates to a waste heat recovery power generation plant to be applied to a sintering facility for generating sintered ore, which is composed of a sintering machine and a sintered-ore cooler.

BACKGROUND ART

Main iron ores used in steel plants are uniform powdery iron ore made by blending powdered iron ores of different origins/proveniences and different properties. When powdery iron ore is directly loaded into a shaft furnace, the shaft furnace is clogged by the powdery iron ore thus inhibiting the flow of a reduction gas. Therefore, in general, small amounts of lime powder and coke are mixed with powdery iron ore in advance, and the powdery iron ore thus mixed with the lime powder and the coke is sintered in a sintering machine into sintered ore pellets of a certain size. In Japan, sintered ores currently account for substantially 75% of the iron ores loaded into a shaft furnace.

The sintered ore is manufactured according to the following steps. Firstly, a granulated sintering material, which is formed by mixing ore powder, lime powder and coke powder, is loaded into a sintering machine and burned. Then, while the sintering material is moved by a conveyor toward a terminal portion, the coke powder is burned by air blown from above to below, which was sucked by a suction blower. Thereafter, the ore powder is partially melted by a combustion heat of the coke so as to bond. Then, the bonded ore is fragmentized and selected, so that sintered ore pellets having a diameter of 15 mm to 30 mm are obtained. The high temperature sintered ore manufactured in the sintering machine is transferred to a sintered-ore cooler. While being transported by a conveyor, the sintered ore is subjected to a cooling air from below the conveyor, so that the sintered ore is cooled to a temperature at which the sintered ore can be stored.

As described above, the sintering facility for manufacturing sintered ore is composed of the sintering machine and the sintered-ore cooler. The sintering machine is configured to burn a sintering material by supplying air thereto. In this case, a gas generated by the combustion becomes an exhaust gas which temperature ranges from a low temperature of about 50° C. to 60° C. at an ignition portion, to a high temperature of about 400° C. to 450° C. at a terminal portion of a conveyor. The sintered-ore cooler is configured to use air to cool the high-temperature sintered ore. In this case, the cooling air becomes a high-temperature exhaust gas of 300° C. to 400° C.

Conventionally, as shown in FIG. 6, for example, a surplus heat of an exhaust gas of a sintered-ore cooler 2 is recovered by a waste heat boiler 30, and steam is generated by the heat. The steam is utilized as a utility steam or as power obtained through a steam turbine 51. In this way, the waste heat of the exhaust gas from the sintered-ore cooler 2 is effectively recovered.

Patent Document 1 discloses an improved invention related to a waste heat recovery method in which a cooling air heated by the sintered-ore cooler 2 is introduced into the waste heat boiler 30 to generate steam, and the generated steam is supplied to the steam turbine 51 so as to generate power.

In the method of recovering a waste heat of the sintered-ore cooler 2 disclosed in Patent Document 1, the sintered-ore cooler 2 is divided into a boiler communication area in which a sintered ore has relatively a higher temperature, and a gas-duct communication area in which a sintered ore has a lower temperature. A cooling gas introduced into the boiler communication area cools a sintered ore, and is then introduced to a boiler through a hood covering the sintered ore, so that a heat of the cooling gas is recovered. A cooling gas introduced into the gas-duct communication area is directly introduced to a gas duct so as to be released to an outside atmospheric air. A feature of the method disclosed in Patent Document 1 resides in that an inside of the hood is always kept at a positive pressure so that an outside atmospheric air cannot enter thereinto in order to prevent lowering of the temperature of a cooling gas to be recovered, and that a partition between the boiler communication area and the gas-duct communication area can be optionally set, whereby a heat recovery rate can be improved.

Patent Document 1 neither describes nor suggests that a surplus heat generated in the sintering machine 1 is recovered and used.

A cement calcination plant including a suspension preheater (PH) and an air quenching cooler (AQC) conventionally uses a waste heat power generation system in which a heat of an exhaust gas of the PH is recovered by a boiler to dry a cement material, and a heat of an exhaust gas of the AQC is recovered to the maximum extent by a boiler so as to generate power. A temperature of the exhaust gas of the pH is 350° C. to 400° C., for example, and a temperature of the exhaust gas of the AQC is 300° C. to 250° C., for example. An amount of the exhaust gas of the AQC is generally greater than that of the PH.

Citation 2, for example, discloses a waste heat power generation system of a cement calcination plant, in which a waste heat of a PH and a waste heat of an AQC are respectively recovered by waste heat boilers, steam is obtained, and power is generated by a turbine driven by steam.

In the waste heat power generation system of the cement calcination plant disclosed in Citation 2, a part of hot water heated by an economizer of an AQC boiler 130 is transformed into low-pressure steam through a flasher, and the low-pressure steam is introduced into a low-pressure stage of the steam turbine. In addition, a part of the remaining hot water is superheated through an evaporator and a superheater of the AQC boiler 130, and the remaining part is further superheated through an evaporator and a superheater of a pH boiler 110. Then, a generated high-pressure steam is introduced into a high-pressure stage of the steam turbine.

As shown in FIG. 7, a feature of the waste heat power generation system of Patent Document 2 resides in that a second evaporator including a steam drum is further provided on an exhaust-gas exit side of the PH boiler 110, that hot water returned from the flasher is introduced into the second evaporator through the steam drum, that the hot water heated by the second evaporator is returned to the steam drum, and that steam generated by the steam drum is put into the low-pressure stage of the steam turbine.

The disclosed waste heat power generation system maintains an outlet gas temperature of the AQC boiler 130 as low as possible. In addition, the PH boiler is configured to generate high-pressure steam and low-pressure steam, so that steam suitable for the respective high-pressure stage and the low-pressure stage of the multi-stage steam turbine can be supplied thereto. Thus, an outlet gas temperature of the PH boiler 110 can be maintained as low as possible. The above system is designed to significantly improve a waste heat recovery rate.

In the disclosed system, a gas temperature, which is 325° C. at an inlet of the PH boiler 110, is lowered down to 165° C. at an outlet thereof. On the other hand, a gas temperature, which is 360° C. at an inlet of the AQC boiler 130, is lowered down to 105° C. at an outlet thereof.

Namely, the disclosed waste heat power generation system can sufficiently recover a waste heat of the AQC and can sufficiently use a waste heat of the PH, so as to transform the waste heat to electrical energy.

From the above, it is conceivable that applying the technical idea of a waste heat power generation system of a cement calcination plant to a sintering facility including a sintering machine and a sintered-ore cooler enables the effective use of a waste heat of the sintering machine. In this case, the sintering machine is combined with a sintering machine boiler (SM boiler), which corresponds to a PH boiler, and the sintered-ore cooler is combined with a sintered-ore-cooler waste heat boiler (SC boiler), which corresponds to an AQC boiler.

However, in the sintering machine, a sulfur component contained in a sintering material is oxidized in the course of a sintering process to generate sulfurous acid gas $SO_2$. In addition, sulfuric anhydride $SO_3$ is generated by further oxidation. Thus, sulfuric anhydride $SO_3$ is contained in an exhaust gas. Therefore, when a temperature of the exhaust gas becomes lower than an acid dew point, the sulfuric acid gas formed by $SO_3$ reacting with steam might condense (form dews) causing sulfuric acid drops to appear on solid surfaces and display the highly corrosive nature of the sulfuric acid drops. Thus, there is a possibility that an outlet portion of the sintered-ore-cooler waste heat boiler, an exhaust gas treatment apparatus provided on a passage through which an exhaust gas of the sintering machine flows, a gas duct and so on might be corroded and damaged.

In the waste heat boiler disclosed in Patent Document 2, an exhaust temperature at an outlet thereof is lowered to thereby obtain an effective waste heat recovery. Thus, when the sintering machine and the waste heat boiler are combined based on the technical idea of the waste heat power generation system of the cement calcination plant disclosed in Patent Document 2, an exhaust gas temperature condition required for the sintering-machine waste heat boiler cannot be satisfied. For example, the exhaust gas may be excessively cooled, causing the outlet portion of the sintered-ore-cooler waste heat boiler and an exhaust gas system to be damaged. Thus, the technical idea of the waste heat power generation system of the cement calcination plant cannot be applied directly to the sintering facility. Thus, a waste heat of an exhaust gas of the sintering machine cannot be effectively recovered in conventional cases.

Patent Document 1: JP2000-226618A
Patent Document 2: JP2008-157183A

DISCLOSURE OF THE INVENTION

An object to be achieved by the present invention is to provide a waste heat recovery power generation plant for sintering facility, which can effectively recover a waste heat of a sintering machine, which could not be fully utilized in conventional cases, so as to improve a waste heat recovery rate of the sintering facility, by recovering a waste heat of a sintered-ore cooler while preventing that sulfuric anhydride contained in an exhaust gas of the sintering machine condenses into sulfuric acid drops.

A first waste heat recovery power generation plant for sintering facility of the present invention to achieve the above object is a waste heat recovery power generation plant to be applied to a sintering facility including a sintering machine and a sintered-ore cooler, the waste heat recovery power generation plant comprising: a multi-stage type steam turbine joined to a power generator; a sintered-ore-cooler waste heat boiler configured to heat condensate of the multi-stage type steam turbine by introducing an exhaust gas of the sintered-ore cooler so as to generate hot water and steam; and a sintering-machine waste heat boiler configured to heat all of or a part of the hot water generated by the sintered-ore-cooler waste heat boiler by introducing a high temperature part of the exhaust gas of the sintering machine so as to generate steam; the steam generated by the sintered-ore-cooler waste heat boiler and the steam generated by the sintering-machine waste heat boiler being supplied to a high-pressure stage of the multi-stage type steam turbine, and a temperature of the hot water to be supplied to the sintering-machine waste heat boiler being controlled such that a temperature of the exhaust gas at an exhaust-gas outlet of the sintering-machine waste heat boiler is maintained to be higher than an acid dew point.

A second waste heat recovery power generation plant for sintering facility of the present invention to achieve the above object is A waste heat recovery power generation plant to be applied to a sintering facility including a sintering machine and a sintered-ore cooler, the waste heat recovery power generation plant comprising: a multi-stage type steam turbine joined to a power generator; a heater configured to heat condensate of the multi-stage type steam turbine by means of a heat of an exhaust gas of the sintered-ore cooler so as to generate hot water; a first steam generator configured to heat a part of the hot water generated by the heater by means of the exhaust gas of the sintered-ore cooler so as to generate steam; and a second steam generator configured to heat a part of the hot water generated by the heater by means of a high temperature part of an exhaust gas of the sintering machine so as to generate steam; the exhaust gas of the sintered-ore cooler, which has been introduced to the first steam generator and discharged from the first steam generator, being introduced to the heater; the steam generated by the first steam generator and the steam generated by the second steam generator being supplied to a high-pressure stage of the multi-stage type steam turbine; and a temperature of the hot water to be supplied to the second steam generator being controlled such that a temperature of an exhaust gas at an exhaust-gas outlet of the second steam generator is maintained to be high than an acid dew point.

According to the waste heat recovery power generation plant of the present invention, power can be generated by recovering a waste heat generated in a sintering machine, which could not be fully recovered conventionally, while preventing corrosion caused sulfuric acid contained in an exhaust gas of the sintering machine, whereby a waste heat utilization rate can be improved as a whole.

MODE FOR CARRYING OUT THE INVENTION

Figure 1:
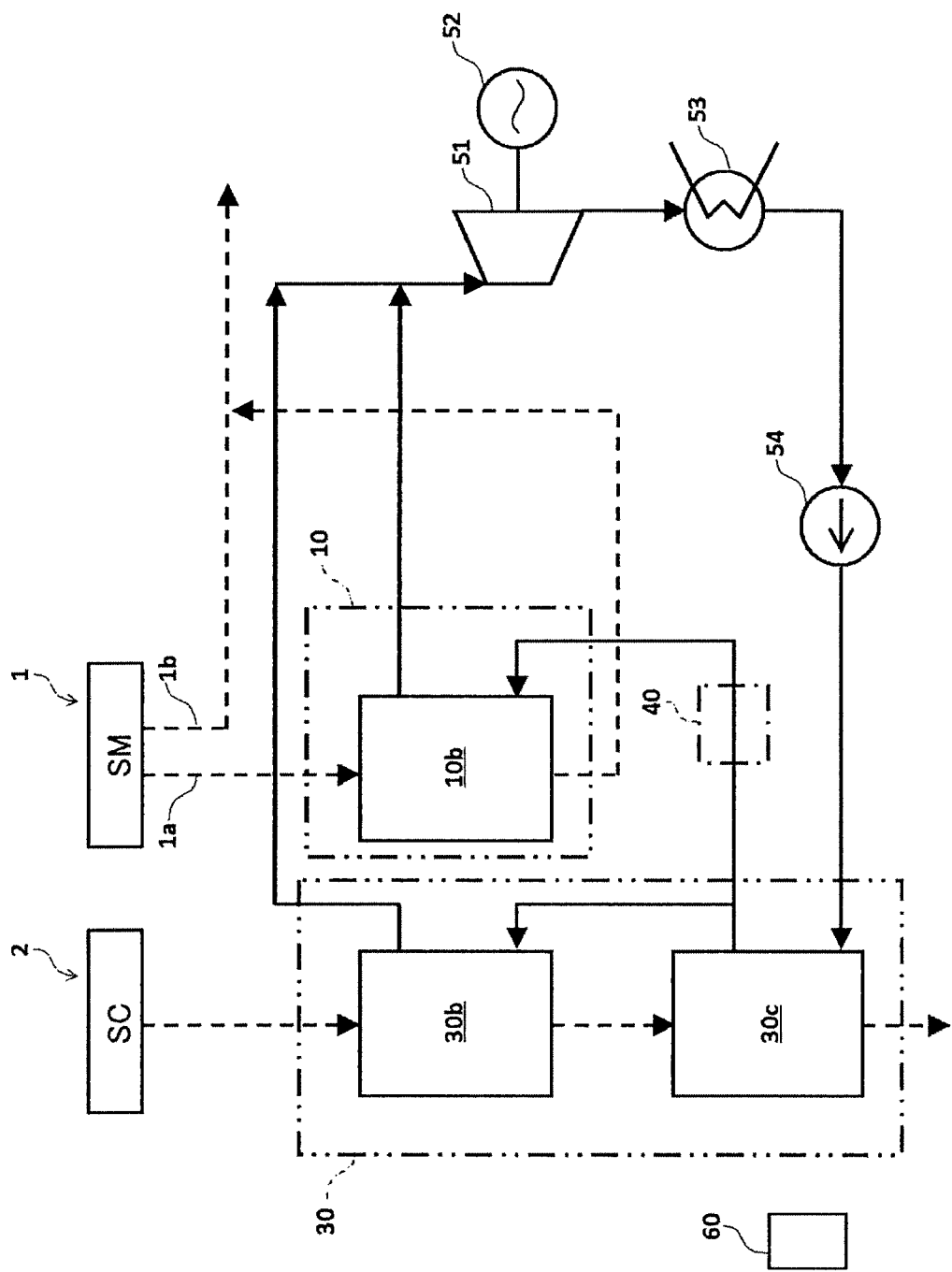
FIG. 1 is a block view of a waste heat recovery power generation plant for sintering facility according to an embodiment of the present invention.

An embodiment of the present invention will be described herebelow with reference to the drawings. In the drawings, the same constituent elements having the same function are shown by the same reference numbers, in order to facilitate understanding.

FIG. 1 is a block view of a waste heat recovery power generation plant for sintering facility according to the embodiment of the present invention. In FIG. 1, solid arrowed lines show flows of hot water and steam, and dotted arrowed lines show a flow of exhaust air.

The waste heat power generation plant for sintering facility shown in FIG. 1 is a waste heat recovery power generation plant that recovers waste heats generated in a sintering machine (SM) 1 and a sintered-ore cooler (SC) 2 in a sintering facility, so as to obtain electric power.

The sintering machine 1 is configured to provide sintered ore by partially melting powdery iron ore by a combustion heat of coke so as to be bond. The obtained sintered ore is put into the sintered-ore cooler 2. A temperature of an exhaust gas generated in the sintering machine 1 ranges from a temperature lower than an acid dew point, which will be described below, to a temperature that is sufficiently higher than the acid dew point.

The exhaust gas in the sintering machine 1 contains a sulfur dioxide gas $SO_2$ generated by an oxidized sulfur component, and sulfuric anhydride $SO_3$ generated by the sulfur dioxide gas that is further oxidized. When a temperature of the exhaust gas containing sulfuric anhydride $SO_3$ becomes lower than the acid dew point, the exhaust gas condenses into sulfuric drops on solid surfaces, which exhibit a high corrosiveness. In this case, there is a possibility that a heat transfer surface of a second steam generator, which will be described below, might be damaged. Thus, it is necessary to keep the temperature of the exhaust gas to be not less than the acid dew point.

A cooling air is blown to the sintered ore having been put into the sintered-ore cooler 2. The cooling air used for cooing the sintered ore becomes a high-temperature exhaust gas.

The waste heat recovery power generation plant for sintering facility according to this embodiment is used with the sintering facility as structured above. The waste heat recovery power generation plant includes: a multi-stage type steam turbine 51 joined to a generator 52; a heater 30c configured to heat condensate of the steam turbine 51 by means of an exhaust gas of the sintered-ore cooler 2 to generate hot water; a first steam generator 30b configured to heat a part of the hot water generated by the heater 30c by means of the exhaust gas of the sintered-ore cooler 2 to generate steam; and a second steam generator 10b configured to heat a part of the hot water generated by the heater 30c by means of an exhaust gas of the sintering machine 1 to generate steam. As long as the condensate of the steam turbine 51 by means of the exhaust gas of the sintered-ore cooler 2, a concrete structure of the heater 30c is not limited. For example, an economizer is used as the heater 30c. As described above, the exhaust gas generated in the sintering machine 1 includes a high temperature part 1a and a low temperature part 1b. The high temperature part 1a of the exhaust gas of the sintering machine 1 is used in the second steam generator 10b. The exhaust gas of the sintered-ore cooler 2, which has been introduced into the first steam generator 30b and discharged from the first steam generator 30b, is introduced into the heater 30c. A temperature of the hot water in the heater 30c and pressures and temperatures of the steam in the first steam generator 30b and the second steam generator 10b are set or controlled by a controller 60.

The steam generated in the first steam generator 30b and the steam generated in the second steam generator 10b are supplied to a high-pressure stage of the steam turbine 51. The generator 52 is configured to transform kinetic energy of a rotating shaft of the steam turbine 51 to electric power. The steam having done the work in the steam turbine 51 is condensed by the condenser 53 to return to water, and the water is supplied again to a boiler by a feed pump 54.

In this embodiment, the heat of the exhaust gas of the sintering machine 1, which has not been conventionally used, can be used in the second steam generator 10b. Thus, an amount of the steam to be supplied to the high-pressure stage of the steam turbine 51 can be increased, whereby a power generation efficiency can be improved.

When the temperature of the exhaust gas introduced to the second steam generator 10b becomes lower than the acid dew point, there is a possibility that a heat transfer surface of the second steam generator 10b might be damaged. In order to prevent this situation, according to this embodiment, hot water, which has been heated by the heater 30c beforehand, is supplied to the second steam generator 10b. In this case, by suitably controlling the temperature of the hot water to be supplied to the second steam generator 10b, a waste heat recovery amount of the exhaust gas in the second steam generator 10b can be limited. Thus, the temperature of the exhaust gas at an exhaust-gas outlet of the second steam generator 10b can be maintained at a temperature higher than the acid dew point, whereby it can be prevented that the heat transfer surface of the second steam generator 10b is damaged.

The hot water generated in the heater 30c may either be supplied directly to the second steam generator 10b or supplied indirectly to the second steam generator 10b. Herein, the term "indirectly" means that at least one element 40 is interposed between the heater 30c and the second steam generator 10b, as shown by the one-dot chain lines in FIG. 1. A steam extractor 40 configured to generate steam by means of a heat of the hot water can be taken as an example of the element 40.

Note that an apparatus including the heater 30c and the first steam generator 30b is sometimes referred to as "SC boiler 30". In addition, an apparatus including the second steam generator 10b is sometimes referred to as "SM boiler 10".

Examples of the present invention will be described herebelow.

Example 1

Figure 2:
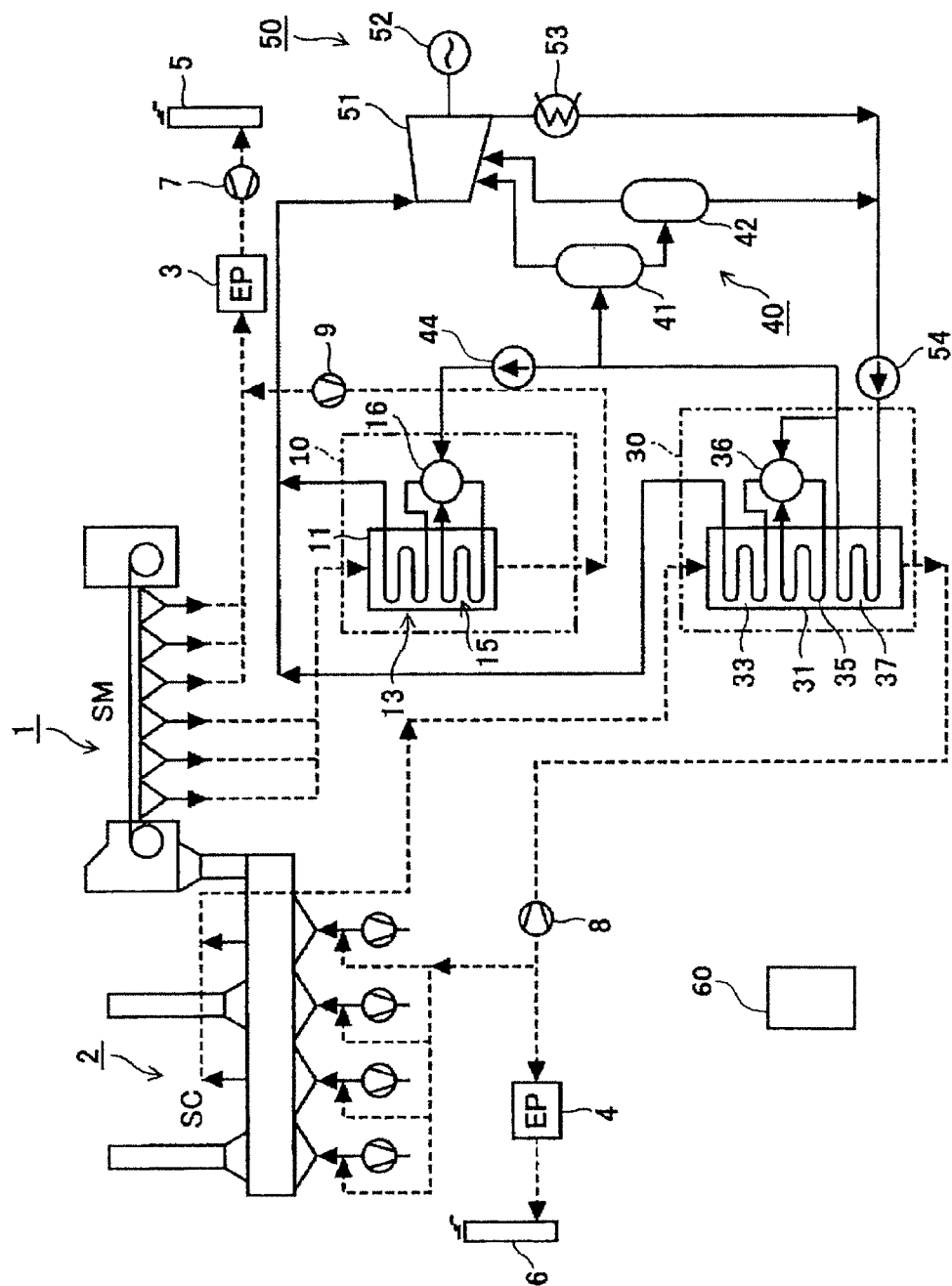
FIG. 2 is a block view of a waste heat recovery power generation plant for sintering facility according to a first example of the present invention.

FIG. 2 is a block view of a waste heat recovery power generation plant for sintering facility according to a first example of the present invention.

The sintering machine 1, which is of a most general Dwight Lloyd type, obtains sintered ore by the following manner. A granulated sintering material, which was formed by mixing ore powder of a diameter of 2 mm to 3 mm, lime powder serving as a solvent and coke powder serving as a fuel, is put into an iron palette in a machine and is burned. While the sintering material in the palette is moved toward a terminal portion, an air flow generated by suction of an exhauster 7 is fed from above to below to burn the coke powder. The ore powder is partially melted by a combustion heat of the coke so as to be bonded, whereby sintered ore is obtained. The sintered ore is fragmented and selected, so that sintered ore pellets having a diameter of 15 mm to 30 mm are obtained. Then, the sintered ore is put into the sintered-ore cooler 2.

A temperature of an exhaust gas, which is generated by burning the sintering material in the sintering machine 1, ranges from a low temperature of about 50° C. to 60° C. at an ignition area to a high temperature of about 400° C. to 450° C. at a combustion completion area.

The exhaust gas in the sintering machine 1 contains a sulfur dioxide gas $SO_2$ generated by an oxidized sulfur component contained in the coke powder and the iron ore, and sulfuric anhydride $SO_3$ generated by the sulfur dioxide gas that is further oxidized. When a temperature of the exhaust gas containing sulfuric anhydride $SO_3$ becomes lower than the acid dew point, the exhaust gas condenses into sulfuric drops on solid surfaces, which exhibit a high corrosiveness. In this case, there is a possibility that a heat transfer surface of a sintering-machine waste heat boiler, a dust collector 3 provided on a gas duct, which will be described below, might be damaged. Thus, it is necessary to keep the temperature of the exhaust gas to be not less than the acid dew point. Although the acid dew point of sulfuric acid varies depending on a partial pressure of $SO_3$ and a partial pressure of water, the acid dew point thereof is on the order of about 120° C. to 140° C.

The high-temperature sintered ore manufactured in the sintering machine 1 is transferred to the sintered-ore cooler 2, and is transported by a conveyor. While being transported by a conveyor, the sintered ore is subjected to a cooling air blowing from below the conveyor, so that the sintered ore is cooled by the cooling air.

In the sintered-ore cooler 2, the cooling air, which has been used for cooling the high-temperature sintered ore, becomes an exhaust gas having a high temperature of 300° C. to 400° C.

Since the exhaust gas of the sintered-ore cooler 2 passes through the fragmented sintered ore, dusts are contained in the exhaust gas. Thus, the dusts are removed by a dust removal device such as the dust collector 4, and then the exhaust gas is discharged to the outside atmospheric air.

The waste heat recovery power generation power for sintering facility according to this example is used with the sintering facility as structured above. The waste heat recovery power generation plant includes: a power generation apparatus 50 having a steam turbine 51, a generator 52 and a condenser 53; a sintered-ore-cooler waste heat boiler (SC boiler) 30; a sintering-machine waste heat boiler (SM boiler) 10; a steam extractor 40; and a feed pump 54 configured to feed condensate. Flow rates and temperatures of hot water in the SC boiler 30 and the SM boiler 10, pressures and temperatures of steam in the steam turbine 51, the SC boiler 30 and the SM boiler 10, and a pressure and a temperature in the steam extractor 40 are set or controlled by a controller 60.

The SC boiler 30 is configured to heat the condensate of the steam turbine 51 by introducing the exhaust gas of the sintered-ore cooler 2 so as to generate hot water and steam. The SC boiler 30 has the same structure as that of a conventionally used one. For example, the SC boiler 30 includes a boiler body 31. The boiler body 31 has a superheater (first superheater) 33, an evaporator (first evaporator) 35 and an economizer (first economizer) 37, and is equipped with a steam drum (first steam drum) 36. A combination of the superheater 33, the evaporator 35 and the steam drum 36 can function as the aforementioned first steam generator 30*b* shown in FIG. 1. The economizer 37 can function as the aforementioned heater 30*c* shown in FIG. 1. The cooling air (exhaust gas), whose temperature has been elevated up to 300° C. to 400° C. in the sintered-ore cooler 2, is supplied to the boiler body 31. Due to the efficient heat exchange of the high-temperature cooling air by the superheater 33, the evaporator 35 and the economizer 37, the water or the steam is heated. The cooling air cooled by the heat exchange is discharged from an outlet of the boiler body 31.

The SM boiler 10 is configured to introduce the exhaust gas of the sintering machine 1 to heat hot water, which is directly supplied from the economizer 37 of the SC boiler 30, so as to generate hot water and steam. For example, the SM boiler 10 includes a boiler body 11. The boiler body 11 has a superheater (second superheater) 13 and an evaporator (second evaporator) 15, and is equipped with a steam drum (second steam drum) 16. A combination of the superheater 13, the evaporator 15 and the steam drum 16 can function as the aforementioned second steam evaporator 10*b* shown in FIG. 1. A high temperature part of the exhaust gas of the sintering machined is introduced to the boiler body 11 by suction of an exhauster 9. Due to the efficient heat exchange of the exhaust gas by the superheater 13 and the evaporator 15, the water or the steam is heated. The exhaust gas cooled by the heat exchange is discharged from an outlet of the boiler body 11. The exhaust gas discharged from the SM boiler 10 is guided to a duct to be merged with a low temperature part of the exhaust gas of the sintering machine 1, and is discharged to the outside atmospheric air from a funnel 5 through a dust collector 3.

The steam turbine 51 of the power generation apparatus 50 is a multi-stage type steam turbine, and includes at least a high-pressure stage for supplying high-pressure steam, a low-pressure stage for supplying low-pressure steam to assist an output, and an intermediate-pressure stage for supplying intermediate-pressure steam of an intermediate pressure to assist an output. The generator 52 is directly connected to the steam turbine 51. The generator 52 is configured to transform kinetic energy of a rotating shaft of the steam turbine 51 to electric power.

The steam having done the work in the steam turbine 51 is condensed by a condenser 53 to return to water, and the water is supplied again to a boiler by a feed pump 54.

The steam extractor 40 is configured to generate steam by means of a heat of the hot water supplied from the economizer 37 of the SC boiler 30, and to supply the generated steam to the steam turbine 51. For example, the steam extractor 40 is structured as a two-stage type flasher 40 including a high-pressure stage flasher 41 as a first-stage flasher, and a low-pressure stage flasher 42 as a second-stage flasher. The high-pressure stage flasher 41 of the two-stage type flasher 40 is configured to separate steam from the hot water supplied from the SC boiler 30, to supply the generated steam to the intermediate stage of the steam turbine 51, and to supply the remaining hot water to the low-pressure stage flasher 42. The low-pressure stage flasher 42 is configured to separate low-pressure steam from the hot water supplied from the high-pressure stage flasher 41, to supply the steam to the low-pressure stage of the steam turbine 51, and to discharge the remaining hot water from a bottom outlet to a pipe system.

The condensate of the multi-stage type steam turbine 51 and the returned hot water of the low-pressure stage flasher 42 are supplied to the economizer 37 of the SC boiler 30 and heated. The heated hot water is supplied to the high-pressure stage flasher 41, the steam drum 16 of the SM boiler 10 and the steam drum 36 of the SC boiler 30.

The hot water supplied to the steam drum 36 of the SC boiler 30 is heated by the evaporator 35 into high-pressure water. The high-pressure water is returned to the steam drum 36 and is separated to gas and liquid. The steam in the steam drum 36 is heated to a temperature higher than a saturation temperature by the superheater 33 into high-pressure steam.

Similarly to the case of the steam drum 36 of the SC boiler 30, the hot water supplied to the steam drum 16 of the SM boiler 10 becomes high-pressure steam by means of the evaporator 15 and the superheater 13. The high-pressure steam generated by the SM boiler 10 is merged with the high-pressure steam generated in the SC boiler 30, and is supplied to the high-pressure stage of the steam turbine 51.

At this time, in order to prevent corrosion caused by sulfuric anhydride in the exhaust gas, it is necessary to maintain the temperature of the exhaust gas at the exhaust-gas outlet of the SM boiler 10 to be higher than the acid dew point, e.g., equal to or more than 160° C. Thus, a waste heat recovery amount in the SM boiler 10 is bound by the temperature and the flow rate of the exhaust gas supplied to the SM boiler 10.

When a pressure or a temperature of the steam to be supplied from the SM boiler 10 to the high-pressure stage of the steam turbine 51 is determined, a temperature and a flow rate of the hot water to be supplied from the economizer 37 of the SC boiler 30 to the steam drum 16 of the SM boiler 10 can be determined based on the waste heat recovery amount which is determined as described above. Thus, the controller 60 controls the temperature and the flow rate of the hot water supplied from the economizer 37 of the SC boiler 30 to the steam drum 16 of the SM boiler 10, such that the exhaust-gas temperature at the exhaust-gas outlet of the SM boiler 10 is maintained to be higher than the acid dew point. For example, the controller 60 sets the temperature of the hot water to be supplied to the steam drum 16, based on the determined pressure of the high-pressure stage of the steam turbine 51 and the determined pressure of the steam drum 16, such that the exhaust-gas temperature at the exhaust-gas outlet of the SM boiler 10 is kept to be higher than the acid dew point, without remarkably lowering the pressure of the steam drum 16. Alternatively, the controller 60 may firstly set the temperature of the hot water to be supplied to the steam drum 16, and then may set the pressure of the high-pressure stage of the steam turbine 51 and the pressure and the temperature of the steam drum 16, in accordance with the set temperature of the hot water. For example, the pressure of the high-pressure stage of the steam turbine 51 is set at 1.25 Mpa, and the pressure and the temperature of the steam drum 16 are set at 1.05 Mpa and 182° C. Generally, the temperature of the hot water to be supplied to the steam drum 16 is set so as to be lower than a water-side temperature of the evaporator 15 by about 5° C. As shown in FIG. 2, there may be provided a pump 44 configured to adjust the flow rate of the hot water to be supplied to the steam drum 16.

Further, the high-pressure stage flasher 41 to which the hot water is supplied from the economizer 37 of the SC boiler 30 is configured to transform, e.g., 10% of the hot water supplied thereto into steam. Then, the high-pressure stage flasher 41 supplies the steam to the intermediate-pressure stage of the steam turbine 51, and supplies the remaining hot water to the low-pressure stage flasher 42. The low-pressure stage flasher can also transform e.g., 10% of the hot water into steam and can supply the steam to the low-pressure stage of the steam turbine 51. The hot water remaining in the low-pressure stage flasher 42 is supplied as returned hot water, together with the condensate of the steam turbine 51 generated by the condenser 53, again to the SC boiler 30 by the feed pump 54.

The cooling air, whose temperature is elevated after it cooled the sintered ore in the sintered-ore cooler 2, is guided to the SC boiler 30, and a waste heat thereof is recovered so that the cooling air is cooled. Then, the cooled cooling air is discharged to the outside atmospheric air from a funnel 6 through a dust removal apparatus such as the dust collector 4. A part of the air cooled by the SC boiler 30 may be returned to the sintered-ore cooler 2 so as to be again used for cooling the sintered ore. Thus, power for taking in an outside air can be saved.

In the waste heat recovery power generation plant as structured above, since an amount of the hot water or steam circulating in the power generation system can be increased by the waste heat recovered in the SM boiler 10, the power generation efficiency can be improved. However, because of the limitation on the exhaust-gas temperature at the outlet of the SM boiler 10, it is preferable that hot water, which is heated by the economizer 37 of the SC boiler 30 up to a suitable temperature, is supplied to the steam drum 16 of the SM boiler 10, in order to obtain high-pressure steam that can be used in the steam turbine 51.

In this case, since a part of the heat amount recovered by the SC boiler 30 is used for the SM boiler 10, steam separated by the flasher decreases correspondingly thereto. However, since a part of the hot water from the SC boiler 30 is heated by the SM boiler 10 so as to be evaporated, the high-pressure steam to be supplied to the steam turbine 51 increases. Thus, the power generation system is more efficient as a whole.

Conventionally, steam generated by the flasher is supplied to the low-pressure stage of the steam turbine 51. On the other hand, in this example, there is used the two-stage type flasher 40 including the high-pressure stage flasher 41 and the low-pressure stage flasher 42. Thus, the steam adaptable to the intermediate-pressure stage of the steam turbine 51 can be generated in the SC boiler, and the generated steam can be injected to the intermediate-pressure stage of the steam turbine 51, whereby power can be enhanced. Namely, by supplying the hot water heated by the economizer 37 to the high-pressure stage flasher 41, an output of the steam turbine 51 can be enhanced.

When the temperature of the hot water to be supplied to the SM boiler 10 increases, the exhaust-gas temperature at the exhaust-gas outlet of the SM boiler 10 generally increases. Namely, the waste heat recovery amount in the SM boiler 10 decreases. Thus, in terms of a power generation efficiency, as long as the condition in which the exhaust-gas temperature at the exhaust-gas outlet of the SM boiler 10 is higher than the acid dew point is satisfied, the temperature of the hot water to be supplied to the SM boiler 10 is preferably low. Thus, the controller 60 is preferably configured to control the temperature of the hot water to be supplied to the SM boiler 10, such that the exhaust-gas temperature at the exhaust-gas outlet of the SM boiler 10 is maintained within a temperature range that is slightly higher than the acid dew point, e.g., within a range between 160° C. and 200° C. For example, the controller 60 controls the exhaust-gas temperature at the exhaust-gas outlet of the SM boiler 10 to be within a range between 140° C. and 180° C. Thus, the waste heat in the SC boiler 30 can be sufficiently recovered, while preventing that the outlet portion of the SM boiler 10 is corroded by sulfuric anhydride in the exhaust gas.

Next, an effect of this example is concretely explained. For example, in a sintering facility in which an exhaust gas is generated by the sintering machine 1 at 200,000 Nm$^3$/h, and an exhaust gas is generated by the sintered-ore cooler 2 at 400,000 Nm$^3$/h, suppose that, under a condition that a temperature of an exhaust gas to be supplied to the SM boiler 10 is 350° C., an exhaust-gas temperature at an outlet is held at a temperature higher than the acid dew point.

In order thereto, for example, the steam drum 16 of the SM boiler 10 is supplied with hot water in such a manner that a temperature of the hot water at an outlet of the economizer 37 of the SC boiler 30 is 177° C. Under this condition, a water-side temperature of the evaporator 15 is held at 182° C., and the exhaust-gas temperature at the outlet of the SM boiler 10 is held at about 200° C.

Although the acid dew point of sulfuric acid depends on a partial pressure of SO$_3$ and a partial pressure of water, the acid dew point herein is on the order of about 120° C. to 140° C. Namely, a difference between the exhaust gas temperature at the outlet of the SM boiler 10 and the acid dew point temperature is 60° C. to 80° C. In addition, an exhaust-gas temperature at a position where the exhaust gas is merged with a low-temperature exhaust gas discharged from the sintering machine 1 can be maintained at about 100° C. that is higher than a water dew point. Thus, sulfuric anhydride SO$_3$ contained in the exhaust gas can be prevented from condensing into sulfuric acid drops, and a sulfuric acid component contained in the exhaust gas can be prevented from becoming solution, whereby corrosion of a heat transfer surface of the waste heat boiler and the exhaust system facility can be prevented.

When the water is flashed at 0.4 MPa by the high-pressure stage flasher 41, 10% of the water becomes steam and 90% thereof become hot water, for example. The steam is supplied to the intermediate-pressure stage of the steam turbine 51, and the hot water is supplied to the low-pressure stage flasher 42. In the low-pressure stage flasher 42, the hot water supplied thereto is flashed at 0.13 MPa, so that the hot water is similarly separated to 10° A) steam and 90% water, for example. The steam is supplied to the lower-pressure stage of the steam turbine 51, and the water, together with the condensate from the condenser 53, is supplied as a return hot water to the SC boiler 30.

Owing to the use of the two-stage flasher, steam of two pressure temperature levels can be generated. Thus, higher-temperature steam with a high potential can be used.

By operating the waste heat recovery power generation plant in this example under the aforementioned condition so as to additionally use the waste heat recovered from the exhaust gas of the sintering machine, about 1.5 times of power could be obtained as compared with a case in which the waste heat is recovered only from the sintered-ore cooler.

Figure 3:
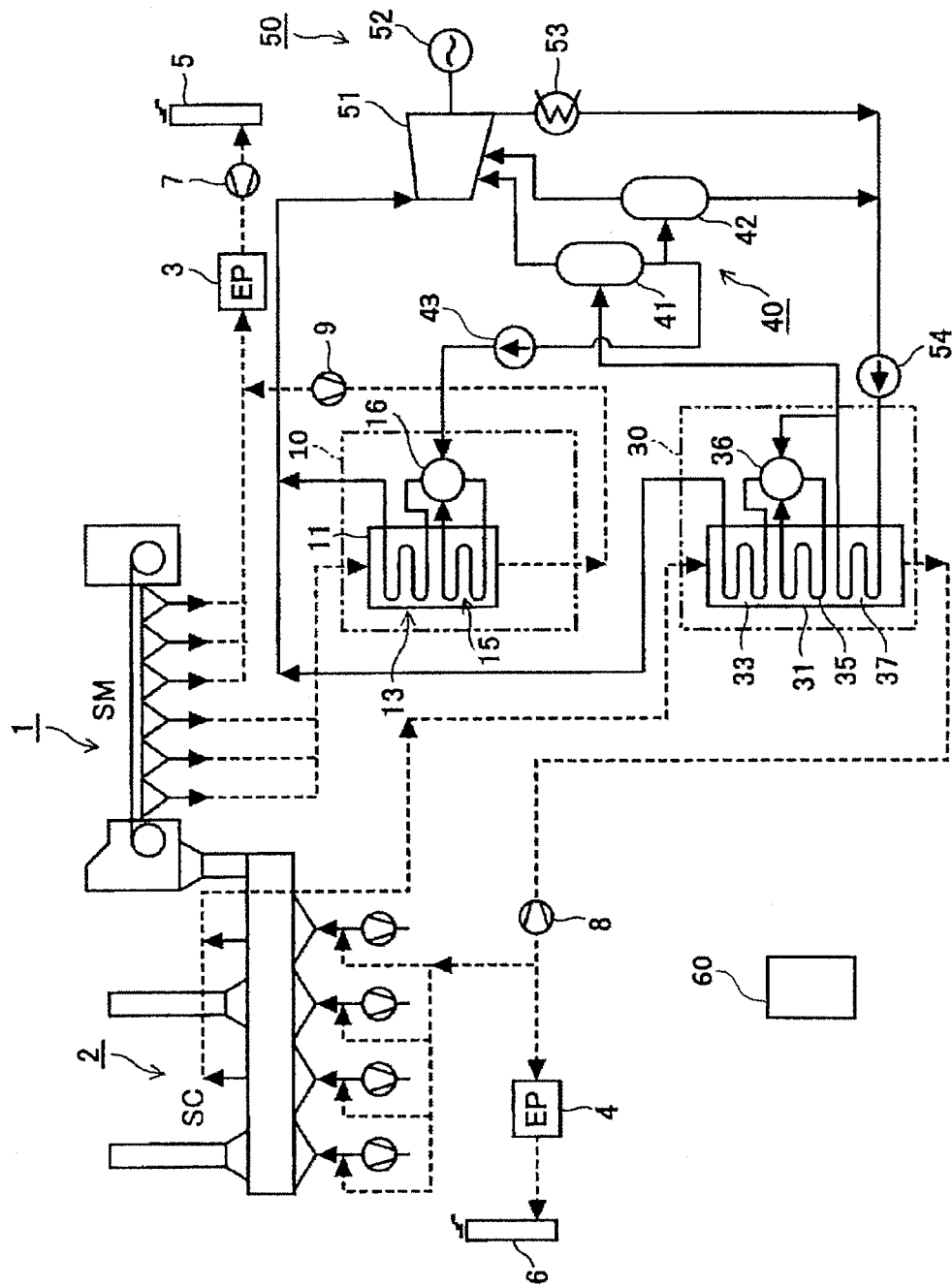
FIG. 3 is a block view of a waste heat recovery power generation plant for sintering facility according to a modification example of the first example of the present invention.

In the example 1 shown in FIG. 2, the hot water heated by the economizer 37 of the SC boiler 30 is directly supplied to the steam drum 16 of the SM boiler 10. However, the present invention is not limited thereto. For example, the hot water heated by the economizer 37 may be indirectly supplied to the steam drum 16. Namely, a certain constituent element that can act on the temperature of the hot water may be disposed between the economizer 37 and the steam drum 16. For example, as shown in FIG. 3, the hot water heated by the economizer 37 may be supplied to the high-pressure stage flasher 41 and the steam drum 36 of the SC boiler 30, and the hot water discharged from the high-pressure stage flasher 41 may be supplied to the low-pressure stage flasher 42 and the steam drum 16 of the SM boiler 10. In this case, the controller 60 controls the temperature and the flow rate of the hot water to be supplied from the high-pressure stage flasher 41 to the steam drum 16 of the SM boiler 10, such that the exhaust-gas temperature at the exhaust-gas outlet of the SM boiler 10 is maintained to be higher than the acid dew point. For example, the controller 60 controls the temperature of the hot water to be supplied from the high-pressure stage flasher 41 to the steam drum 16 to be within a range between 140° C. and 180° C., such that the exhaust-gas temperature at the exhaust-gas outlet of the SM boiler 10 is maintained within a range between 160° C. and 200° C. In general, the pressure of the hot water which has been decompressed by the high-pressure stage flasher 41 and is discharged from the high-pressure stage flasher 41 is lower than the pressure of the steam drum 16. Thus, in the embodiment shown in FIG. 3, there is provided a pressurizing pump 43 for regulating the flow rate and the pressure of the hot water to be supplied to the steam drum 16.

As described in the example 1, when the temperature of the hot water to be supplied to the steam drum 16 of the SM boiler 10 is too high, the waste heat recovery amount in the SM boiler 10 decreases. On the other hand, when the temperature of the hot water to be supplied to the high-pressure stage flasher 41 is too low, the pressure of the steam to be separated by the high-pressure stage flasher 41 decreases, so that the output of the steam turbine 51 reduces. In the modification example shown in FIG. 3, the hot water heated by the economizer 37 is supplied to the high-pressure stage flasher 41, and the hot water, from which steam has been separated by the high-pressure stage flasher 41, is supplied to the steam drum 16 of the SM boiler 10. Thus, the temperature of the hot water to be supplied to the high-pressure stage flasher 41 can be elevated, while preventing the temperature of the hot water to be supplied to the steam drum 16 from elevating too much. Thus, the waste heat recovery amount in the SM boiler 10 can be increased, as well as the pressure of the steam separated by the high-pressure stage flasher 41 can be elevated.

For example, the hot water is heated to 177° C. by the economizer 37 of the SC boiler 30, and the heated hot water is supplied to the high-pressure stage flasher 41. In addition, while the pressure of the high-pressure stage flasher 41 is maintained at an intermediate-pressure stage pressure corresponding to a saturation temperature of 144° C., the hot water is separated to gas and liquid. A part of the generated hot water is supplied to the steam drum 16 of the SM boiler 10. On the other hand, the controller 60 sets the pressure and the temperature of the steam in the steam drum 16, based on the temperature of the hot water to be supplied to the steam drum 16. As a result, the water-side temperature of the evaporator 15 is held at 182° C., and the exhaust-gas temperature at the outlet of the SM boiler 10 is held at about 200° C.

In the aforementioned example 1 and its modification example, the exhaust-gas temperature at the outlet of the SM boiler 10 is made higher than the acid dew point, whereby the outlet portion of the SM boiler 10 is prevented from being corroded by sulfuric anhydride. On the other hand, in consideration of maintenance of the waste heat recovery power generation plant as a whole, it is preferable that not only the outlet portion of the SM boiler 10 but also an exhaust system facility such as a gas duct is subjected to an anti-corrosion treatment. For example, when an exhaust gas containing sulfuric acid gas has a temperature not more than the water dew point, the sulfuric acid may be dissolved in the condensed water into a sulfuric acid solution. If such a sulfuric acid solution adheres to a metal surface, the metal surface is seriously corroded. Thus, the temperature of the exhaust gas in a gas duct is preferably higher than the water dew point temperature (water dew point). Although the water dew point varies depending on a partial pressure of steam in a gas, the water dew point is on the order of about 60° C. to 80° C. Thus, the temperature of the exhaust gas passing through an exhaust system facility such as a gas duct is preferably maintained at 100° C. or more, for example.

In the aforementioned example 1 and its modification example, the exhaust gas discharged from the outlet of the SM boiler 10 merges with the low-temperature exhaust gas, which does not pass through the SM boiler 10 and is generated at the ignition portion of the sintering machine, and is then discharged from the funnel to the outside atmospheric air through the exhaust gas treatment apparatus such as a dust collector. In this case, when the temperature of the exhaust gas after being merged is lower than the water dew point, the exhaust system facility such as a gas duct may be corroded. Thus, preferably, the temperature and the flow rate of the exhaust gas to be discharged from the outlet of the SM boiler 10 are controlled, and the exhaust system facility such as a gas duct is designed, such that the temperature of the exhaust gas after being merged is maintained to be higher than the water dew point.

By using the waste heat recovery power generation plant of the aforementioned example or its modification example, a waste heat can be recovered from an exhaust gas generated in the sintering machine 1 thereby to operate the sintering facility more efficiently, while restraining damage of the outlet portion of the SM boiler 10 and various equipments in the exhaust gas pipes, which might be caused by sulfuric anhydride generated in the sintering machine 1.

The waste heat recovery power generation plant of this example or its modification example includes a feed water system that is shared by the SM boiler 10 and the SC boiler 30, which is advantageous in a low installation cost and a simple operation. Thus, such a waste heat recovery power generation plant is suited for a case in which an amount of a usable waste heat generated in the sintering machine is relatively small.

Example 2

Figure 4:
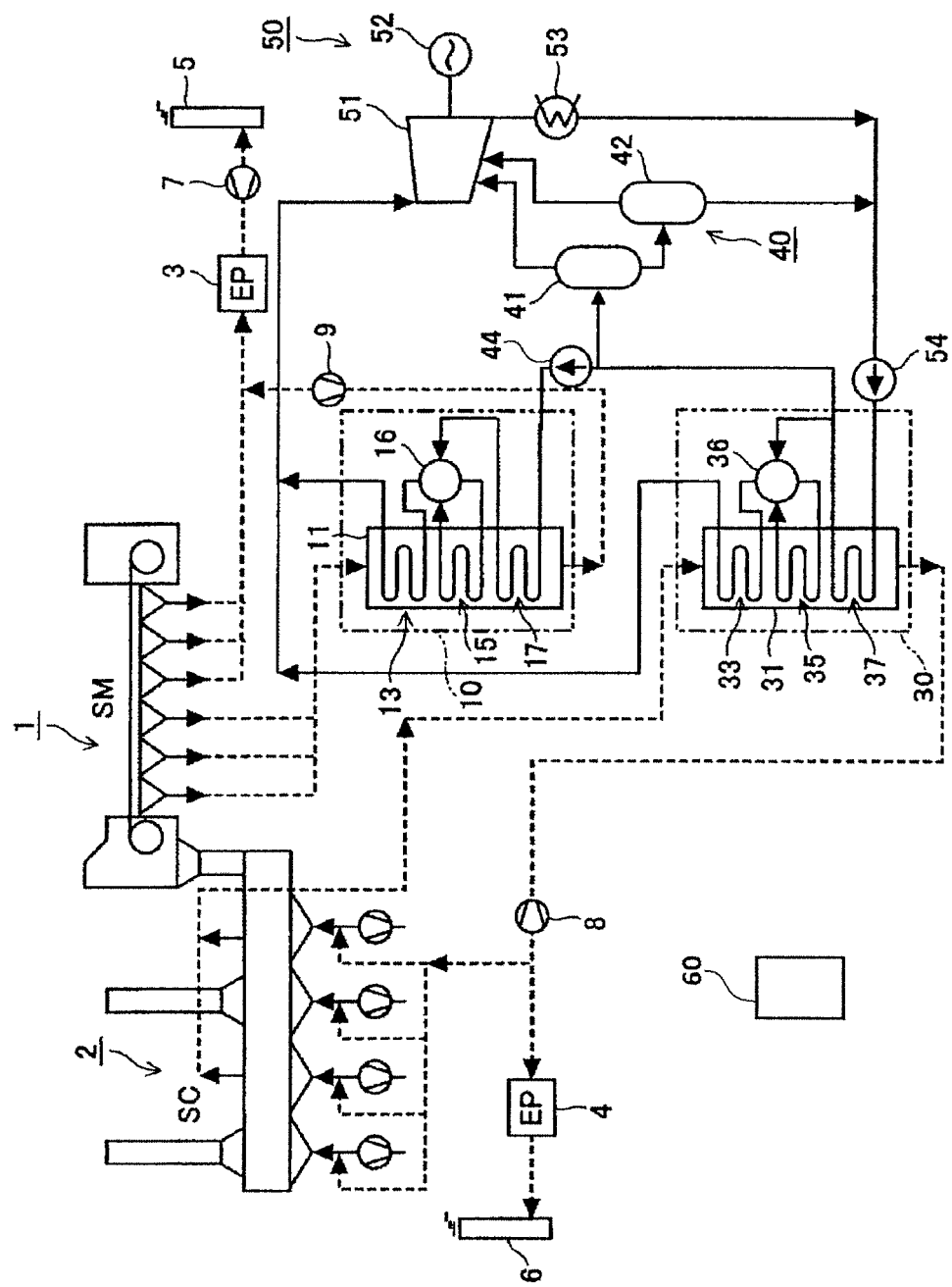
FIG. 4 is a block view of a waste heat recovery power generation plant for sintering facility according to a second example of the present invention.

FIG. 4 is a block view of a waste heat recovery power generation plant for sintering facility according to a second example of the present invention. In FIG. 4, an element having the same function as that of FIG. 2 is shown by the same reference number as that of FIG. 2, and detailed description thereof is omitted for simplicity.

The waste heat recovery power generation plant in the second example differs from the waste heat recovery power generation plant in the first example in that the sintering-machine waste heat boiler (SM boiler) 10 is further provided with an economizer (second economizer) 17, and that a pipe system is changed a little. There is no other significant difference therebetween in other structure.

In the waste heat recovery power generation plant in this example, water supplied from a condenser 53 and a low-pressure stage flasher 42 by means of a feed pump 54 is heated by an economizer 37 of an SC boiler 30 into hot water, and the hot water is supplied to a steam drum 36 of the SC boiler 30, the economizer 17 of the SM boiler 10, and a high-pressure stage flasher 41. The hot water supplied to the steam drum 36 is heated by an evaporator 35, and is returned to the steam drum 36 where the hot water is separated to gas and liquid to generate steam. The generated saturated steam becomes high-pressure steam by a superheater 33, and is supplied to a high-pressure stage of a steam turbine 51.

In addition, the hot water supplied to the economizer 17 of the SM boiler 10 is heated by the economizer 17, and is then supplied to the steam drum 16. The hot water supplied to the steam drum 16 becomes high-pressure steam by the evaporator 15 and the superheater 13. The high-pressure steam, together with high-pressure steam supplied from the SC boiler 30, is supplied to the high-pressure stage of the steam turbine 51.

The waste heat recovery power generation plant in this example can also increase a heat energy to be supplied to the steam turbine 51, by a waste heat recovered in the SM boiler 10, to thereby enhance a power generation amount. Similarly to the aforementioned example 1 and its modification example, the controller 60 is configured to control the temperature and the flow rate of the hot water to be supplied from the economizer 37 of the SC boiler 30 to the economizer 17 of the SM boiler 10, such that the exhaust-gas temperature at the exhaust-gas outlet of the SM boiler 10 is maintained to be higher than the acid dew point. For example, the controller 60 controls the temperature of the hot water to be supplied from the economizer 37 of the SC boiler 30 to the economizer 17 of the SM boiler 10 to be within a range between 140° C. and 180° C., such that the exhaust-gas temperature at the exhaust-gas outlet of the SM boiler 10 is maintained within a range between 160° C. and 200° C. Thus, a waste heat in the SC boiler 30 can be sufficiently recovered, while preventing corrosion of the outlet portion of the SM boiler 10 by sulfuric anhydride in the exhaust gas.

In addition, in this example, instead of directly supplying the hot water from the SC boiler 30 to the steam drum 16, the hot water heated by the economizer 17 is supplied to the steam drum 16. Thus, as compared with a case in which the economizer 17 is not provided, the temperature of the hot water to be supplied to the steam drum 16 can be more increased, while preventing that the exhaust-gas temperature at the exhaust-gas outlet of the SM boiler 10 from becoming too high. Thus, the pressure of the steam drum 16 and the pressure of the high-pressure stage of the steam turbine 51 can be more increased. For example, the pressure of the high-pressure stage of the steam turbine 51 is set at 2.5 MPa, and the pressure and the temperature of the steam drum 16 are set at 2.7 MPa and 233° C. Thus, the output of the steam turbine 51 can be enhanced.

For example, hot water is heated to 177° C. by the economizer 37 of the SC boiler 30, and the heated hot water is supplied to the high-pressure stage flasher 41 and the economizer 17 of the SM boiler 10. In addition, hot water is heated to 233° C. by the economizer 17, and the heated hot water is supplied to the steam drum 16 of the SM boiler 10. At this time, the exhaust-gas temperature at the outlet of the SM boiler 10 is maintained at about 200° C.

Figure 5:
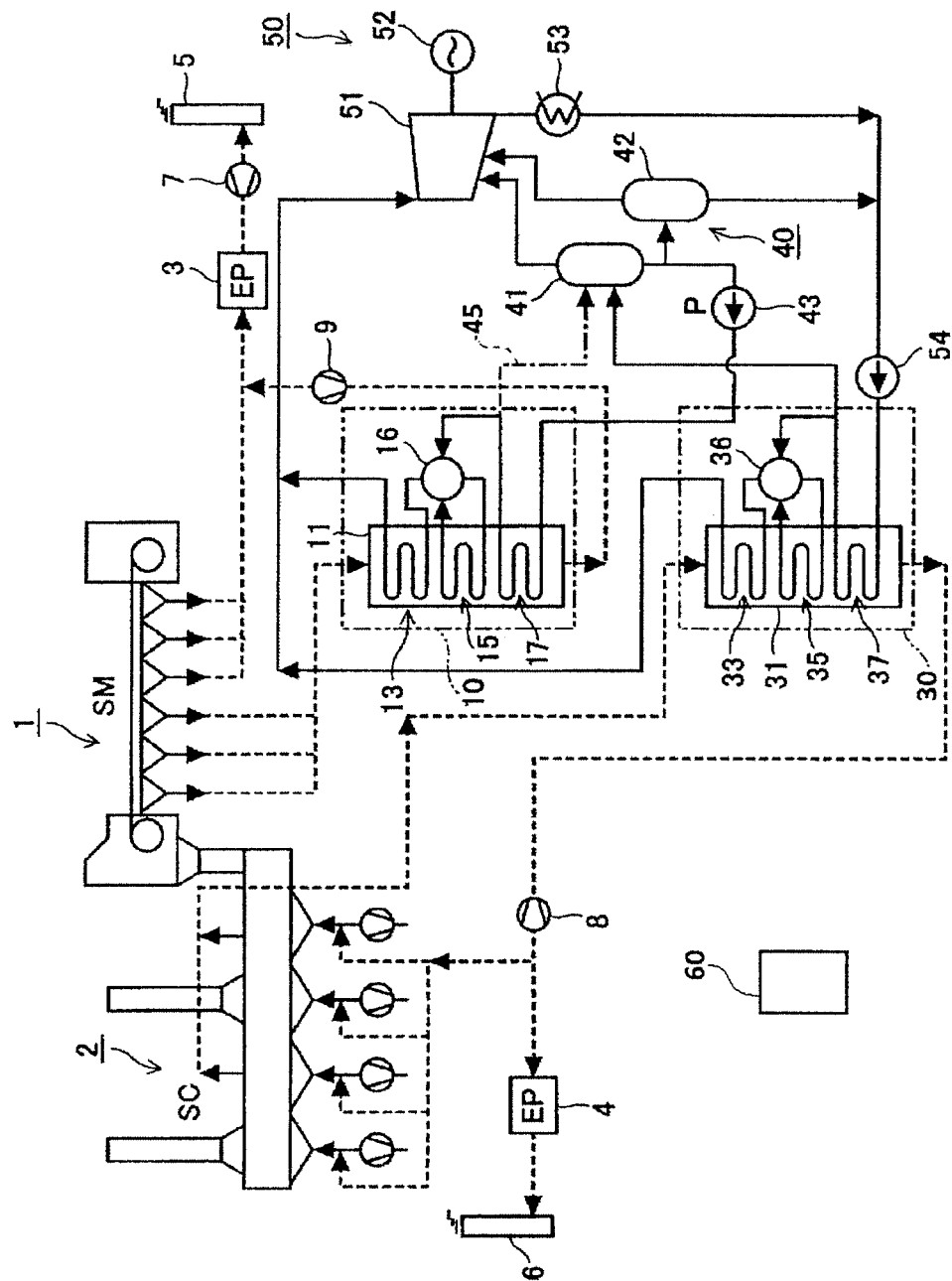
FIG. 5 is a block view of a waste heat recovery power generation plant for sintering facility according to a modification example of the second example of the present invention.
Figure 6:
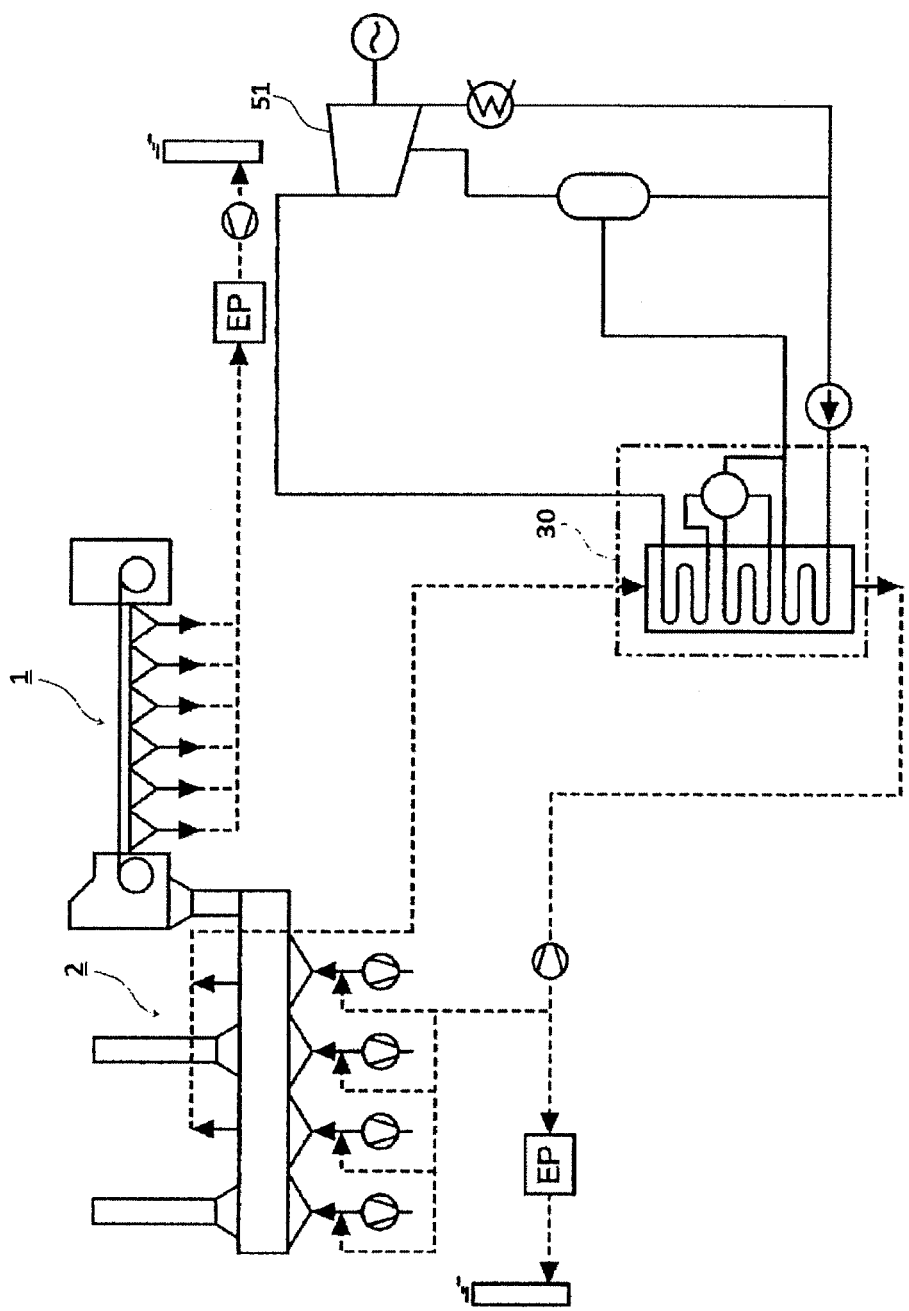
FIG. 6 is a block view showing an example of a conventional waste heat recovery power generation plant for sintering facility.
Figure 7:
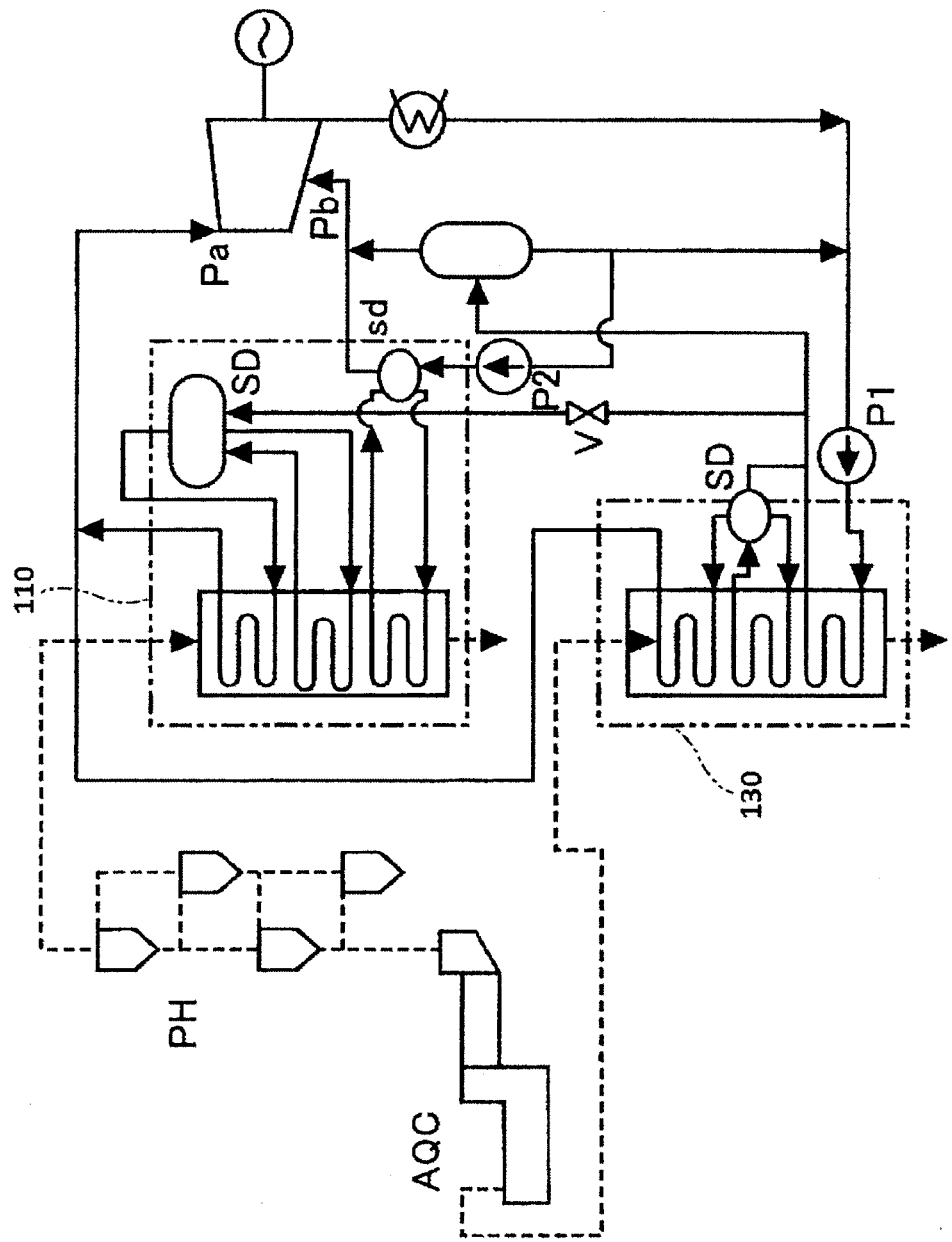
FIG. 7 is a block view showing an example of a waste heat recovery power generation system applied to a conventional cement calcination plant.

In the example 2 shown in FIG. 4, the hot water heated by the economizer 37 of the SC boiler 30 is directly supplied to the economizer 17 of the SM boiler 10. However, the present invention is not limited thereto. For example, the hot water heated by the economizer 37 may be indirectly supplied to the economizer 17. Namely, a constituent element that can act on the temperature of the hot water may be disposed between the economizer 37 and the economizer 17. For example, similarly to the modification example of the aforementioned example 1, the high-pressure stage flasher 41 may be disposed between the SC boiler 30 and the SM boiler 10. To be specific, as shown in FIG. 5, the hot water heated by the economizer 37 may be supplied to the high-pressure stage flasher 41 and the steam drum 36 of the SC boiler 30, and the hot water of the high-pressure stage flasher 41 may be supplied to the low-pressure stage flasher 42 and the economizer 17 of the SM boiler 10. In this case, the controller 60 is configured to control the temperature and the flow rate of the hot water to be supplied from the high-pressure stage flasher 41 to the economizer 17 of the SM boiler 10, such that the exhaust-gas temperature at the exhaust-gas outlet of the SM boiler 10 is maintained to be higher than the acid dew point. For example, the controller 60 controls the temperature of the hot water to be supplied from the high-pressure stage flasher 41 to be economizer 17 to be within a range between 140° C. and 180° C., such that the exhaust-gas temperature at the exhaust-gas outlet of the SM boiler 10 is maintained within a range between 160° C. and 200° C.

According to this modification example, the hot water heated by the economizer 37 is supplied to the high-pressure stage flasher 41, and the hot water of the high-pressure stage flasher 41 is supplied to the economizer 17 of the SM boiler 10. Thus, the temperature of the hot water to be supplied to the high-pressure stage flasher 41 can be elevated, while preventing the temperature of the hot water to be supplied to the economizer 17 from becoming too high. Therefore, the waste heat recovery amount in the SM boiler 10 can be increased, as well as the pressure of the steam to be separated by the high-pressure stage flasher 41 can be increased.

For example, gas and liquid are separated from each other, while maintaining the pressure of the high-pressure stage flasher 41 at the pressure of the intermediate-pressure stage corresponding to the saturation temperature of 144° C. Then, a part of the generated water is supplied to the economizer 17 of the SM boiler 10. Thus, the exhaust-gas temperature at the outlet of the SM boiler 10 can be maintained at about 160° C. which is higher than the acid dew point by 20° C. to 40° C. In addition, the hot water is heated to 233° C. by the economizer 17, and the heated hot water is supplied to the steam drum 16 of the SM boiler 10. Therefore, the pressures of the high-pressure stage and the intermediate-pressure stage of the steam turbine 51 can be sufficiently increased to enhance the output of the steam turbine 51, while restraining that sulfuric anhydride contained in the exhaust gas and the sulfuric acid gas from condensing to form drops.

In this modification example, the hot water heated by the economizer 17 may be distributed to the high-pressure stage flasher 41 in addition to the steam drum 16, which is shown by a route indicted by the reference number 45 in FIG. 5.

Thus, the steam generated by the high-pressure stage flasher 41, i.e., the steam to be injected to the intermediate-pressure stage of the steam turbine 51 can be increased, whereby the output of the steam turbine 51 can be enhanced.

Although the waste heat recovery generation power plant of this example or its modification example needs a higher installation cost because the SM boiler 10 is provided with the economizer 17, a larger amount of the waste heat of the sintering machine 1 can be recovered. Thus, the waste heat recovery power generation plant in this example or its modification example is suited for a case in which a ratio of a usable waste heat occupied by the sintering machine 1 is larger relative to the overall ratio of a usable waste heat of the sintering machine 1 and the sintered-ore cooler 2.

In the aforementioned first example or its modification example and in the aforementioned second example or its modification example, the two-stage type flasher 40 is used as a steam extractor. However, the structure of the steam extractor is not limited to a flasher. For example, the steam extractor may be structured as a gas/liquid separator configured to transform hot water to steam without decreasing pressure.

INDUSTRIAL APPLICABILITY

By applying the waste heat recovery power generation plant for sintering facility of the present invention to a sintering facility for manufacturing sintered ore which is required for manufacturing iron, a waste heat generated in a sintering machine can be recovered as electric power so as to save energy.

The invention claimed is:
1. A waste heat recovery power generation plant to be applied to a sintering facility including a sintering machine and a sintered-ore cooler, the waste heat recovery power generation plant comprising:
 a multi-stage type steam turbine including a high-pressure stage, an intermediate-pressure stage and a low-pressure stage and being joined to a power generator;
 a sintered-ore-cooler waste heat boiler configured to heat condensate of the multi-stage type steam turbine by introducing an exhaust gas of the sintered-ore cooler so as to generate hot water and steam; and
 a sintering-machine waste heat boiler configured to heat all of or a part of the hot water generated by the sintered-ore-cooler waste heat boiler by introducing a high temperature part of an exhaust gas of the sintering machine so as to generate steam,
 wherein:
 the steam generated by the sintered-ore-cooler waste heat boiler and the steam generated by the sintering-machine waste heat boiler are supplied to a high-pressure stage of the multi-stage type steam turbine;
 a temperature of the hot water to be supplied to the sintering-machine waste heat boiler is controlled such that a temperature of the exhaust gas at an exhaust-gas outlet of the sintering-machine waste heat boiler is maintained to be higher than an acid dew point;
 the sintered-ore-cooler waste heat boiler includes a first evaporator, a first superheater, a first economizer and a first steam drum;
 the sintering-machine waste heat boiler includes at least a second evaporator, a second superheater and a second steam drum;
 the first economizer is configured to heat the condensate of the multi-stage type steam turbine, and the heated hot water is supplied to the first steam drum and is directly or indirectly supplied to the sintering-machine waste heat boiler; and steam generated by the first evaporator and the first superheater and steam generated by the second evaporator and the second superheater are supplied to the high-pressure stage of the multi-stage type steam turbine, the waste heat recovery power generation plant further comprising a steam extractor configured to generate steam by means of heat of the hot water supplied from the first economizer of the sintered-ore-cooler waste heat boiler and configured to supply the generated steam to the multi-stage type steam turbine, wherein hot water discharged from the steam extractor is supplied to the sintering-machine waste heat boiler;

the steam extractor includes a first stage flasher configured to supply steam to an intermediate-pressure stage of the multi-stage type steam turbine, and a second stage flasher configured to supply steam to a low-pressure stage of the multi-stage type steam turbine;

the first economizer is configured to heat condensate of the multi-stage type steam turbine and returned hot water of the second stage flasher, and the heated hot water is supplied to the first stage flasher and the first steam drum; and hot water discharged from the first stage flasher is supplied to the second stage flasher and the sintering-machine waste heat boiler.

2. The waste heat recovery power generation plant for sintering facility according to claim 1, wherein:

the sintering-machine waste heat boiler further includes a second economizer;

the hot water discharged from the first stage flasher is supplied to the second stage flasher and the second economizer of the sintering-machine waste heat boiler; and hot water heated by the second economizer is supplied to the second steam drum.

3. The waste heat recovery power generation plant for sintering facility according to claim 2, wherein the hot water heated by the second economizer is supplied to the second steam drum and the first stage flasher.

4. The waste heat recovery power generation plant for sintering facility according to claim 1, wherein the temperature of the hot water to be supplied to the sintering-machine waste heat boiler is controlled such that the temperature of the exhaust gas at the exhaust-gas outlet of the sintering-machine waste heat boiler is maintained within a range between 160° C. and 200° C.

5. The waste heat recovery power generation plant for sintering facility according to claim 4, wherein the temperature of the hot water to be supplied to the sintering-machine waste heat boiler is controlled within a range between 140° C. and 180° C.

6. A waste heat recovery power generation plant to be applied to a sintering facility including a sintering machine and a sintered-ore cooler, the waste heat recovery power generation plant comprising:

a multi-stage type steam turbine including a high-pressure stage, an intermediate-pressure stage and a low-pressure stage and being joined to a power generator;

a sintered-ore-cooler waste heat boiler configured to heat condensate of the multi-stage type steam turbine by introducing an exhaust gas of the sintered-ore cooler so as to generate hot water and steam; and as sintering-machine waste heat boiler configured to heat all of or a part of the hot water generated by the sintered-ore-cooler waste heat boiler by introducing a high temperature part of an exhaust gas of the sintering machine so as to generate steam, wherein:

the steam generated by the sintered-ore-cooler waste heat boiler and the steam generated by the sintering-machine waste heat boiler are supplied to a high-pressure stage of the multi-stage type steam turbine;

a temperature of the hot water to be supplied to the sintering-machine waste heat boiler is controlled such that a temperature of the exhaust gas at an exhaust-gas outlet of the sintering-machine waste heat boiler is maintained to be higher than an acid dew point;

the sintered-ore-cooler waste heat boiler includes a first evaporator, a first superheater, a first economizer and a first steam drum;

the sintering-machine waste heat boiler includes at least a second evaporator, a second superheater and a second steam drum;

the first economizer is configured to heat the condensate of the multi-stage type steam turbine, and the heated hot water is supplied to the first steam drum and is directly or indirectly supplied to the sintering-machine waste heat boiler; and steam generated by the first evaporator and the first superheater and steam generated by the second evaporator and the second superheater are supplied to the high-pressure stage of the multi-stage type steam turbine;

the waste heat recovery power generation plant further comprising a steam extractor configured to generate steam by means of heat of the hot water supplied from the first economizer of the sintered-ore-cooler waste heat boiler and configured to supply the generated steam to the multi-stage type steam turbine, wherein the hot water heated by the first economizer is supplied to the steam extractor, the sintering-machine waste heat boiler and the first steam drum;

the steam extractor includes a first stage flasher configured to supply steam to an intermediate-pressure stage of the multi-stage type steam turbine, and a second stage flasher configured to supply steam to a low-pressure stage of the multi-stage type steam turbine; and the first economizer is configured to heat condensate of the multi-stage type steam turbine and returned hot water of the second stage flasher, and the heated hot water is supplied to the first stage flasher, the sintering-machine waste heat boiler and the first steam drum.

7. The waste heat recovery power generation plant for sintering facility according to claim 6, wherein:

the sintering-machine waste heat boiler further includes a second economizer;

hot water heated by the first economizer is supplied to the first stage flasher, the second economizer of the sintering-machine waste heat boiler and the first steam drum; and hot water heated by the second economizer is supplied to the second steam drum.

8. The waste heat recovery power generation plant for sintering facility according to claim 6, wherein the temperature of the hot water to be supplied to the sintering-machine waste heat boiler is controlled such that the temperature of the exhaust gas at the exhaust-gas outlet of the sintering-machine waste heat boiler is maintained within a range between 160° C. and 200° C.

9. The waste heat recovery power generation plant for sintering facility according to claim 8, wherein the temperature of the hot water to be supplied to the sintering-machine waste heat boiler is controlled within a range between 140 C and 180 C.

* * * * *